United States Patent [19]

Nakshbendi

[11] 3,949,056

[45] Apr. 6, 1976

[54] METHOD FOR TREATING AIR CONTAINING ODORIFEROUS SUBSTANCES

[76] Inventor: Ghassan F. Nakshbendi, 300 Central Park Ave., Hartsdale, N.Y. 10530

[22] Filed: June 10, 1974

[21] Appl. No.: 477,920

[52] U.S. Cl. ................. 423/210; 423/224; 423/230
[51] Int. Cl.² ......................................... B01D 45/00
[58] Field of Search ..................... 423/210, 230, 224

[56] References Cited
UNITED STATES PATENTS

| | | | |
|---|---|---|---|
| 1,961,878 | 6/1934 | Gilkey | 423/210 X |
| 2,203,188 | 6/1940 | Beer | 423/210 X |

*Primary Examiner*—Arthur J. Steiner
*Attorney, Agent, or Firm*—Friedman & Goodman

[57] ABSTRACT

A method of treating air containing odoriferous substances includes the step of introducing ozone into the contaminated air at a first treatment zone and exposing the contaminated air to the ozone for a predetermined time period. The ozone is maintained in contact with the odoriferous substances for a sufficient time to oxidize a substantial portion of the latter. The mixture of ozone and air is then transferred to a second treatment zone where the ozone remaining in the mixture not utilized in the oxidation process is converted into stable oxygen molecules. In this manner, the treated air is substantially free of odoriferous substances as well as ozone upon the removal thereof from the second treatment zone.

3 Claims, 2 Drawing Figures

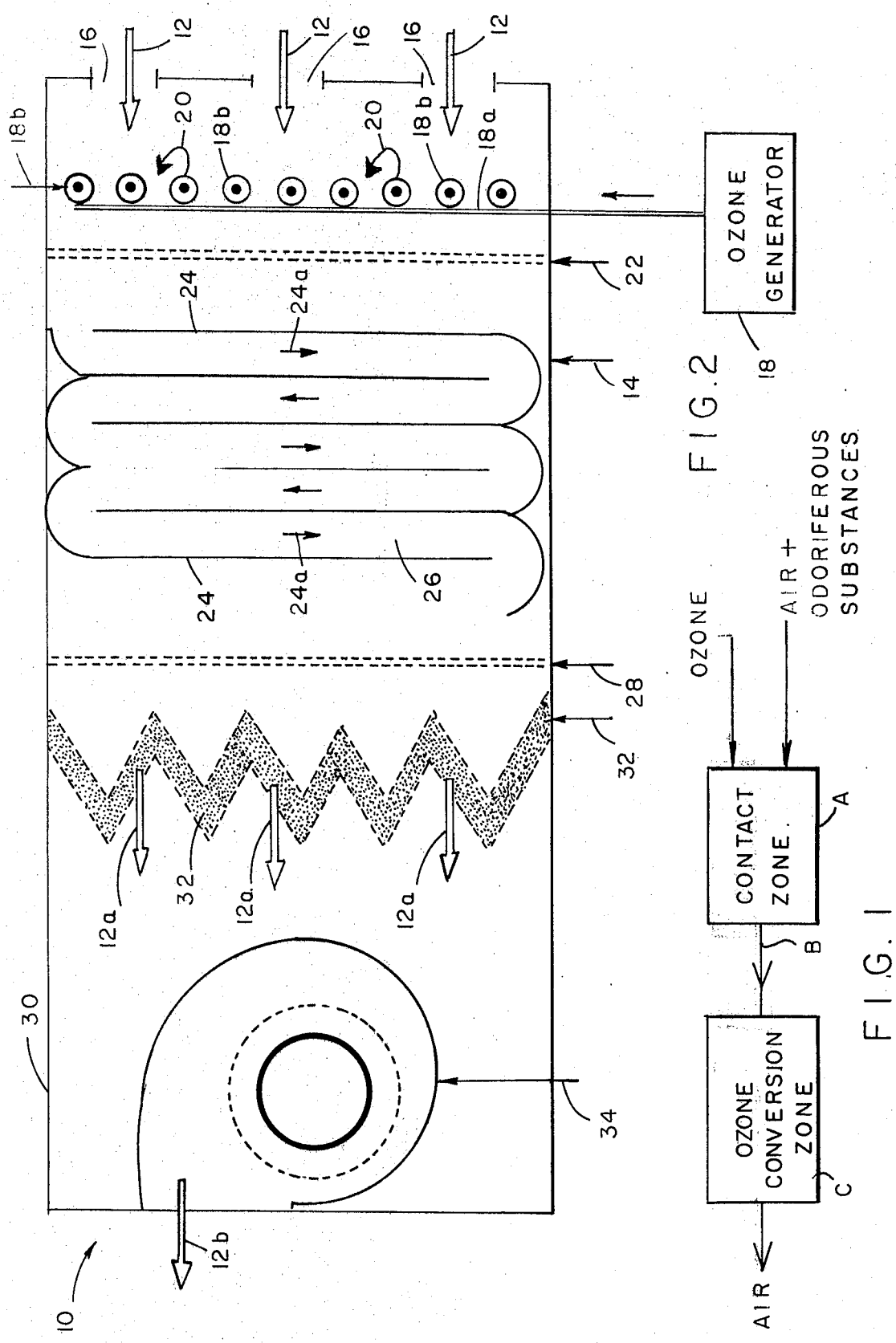

METHOD FOR TREATING AIR CONTAINING ODORIFEROUS SUBSTANCES

BACKGROUND OF THE INVENTION

This invention generally relates to a method and apparatus for purification of air, and more specifically to a method and apparatus for removing odoriferous substances from air by ozone oxidation and additionally treating the remaining mixture to eliminate the ozone molecules therefrom.

Odor may be controlled by the following methods: ventilation, combustion, masking and counteraction, destruction by chemical reactions, and removal by sorption and chemisorption.

Open windows have long been the symbol of wholesome indoor living quarters. The method involved — ventilation — is one of the simplest methods of air purification and consists basically in bringing odorous gasses or vapors below a threshhold limit or in certain cases below odor limits at which the human nose can sense. However, ventilation becomes uneconomical in January and other midwinter months when heating must be provided.

Combustion is most expensive of the methods, and consists of oxidizing or burning at high temperatures the hydrocarbons or organic compounds that most odorous vapors consist of, converting them to $CO_2$ and water vapor. In certain cases, the burning of sulfur and nitrogen containing compounds merely convert them to new oxides that have a higher tolerability limit than the parent compound, and thus are less objectionable. However, due to the fact that combustion normally takes place at 1200° to 1400°F in incinerators and afterburners, and at 500°–800°F with the aid of catalysts, combustion becomes practical only in certain instances. For example, combustion may be practical when effluent gasses are well above the ambient temperatures. Also, when waste heat can be economically used for process heating or returned to fuel system for economy. Further, when the odorants have not economical value and can contribute to heat or combustion.

A further disadvantage of combustion is that it must generally be complete. Incomplete combustion or partial oxidation of some organic compounds produces intermediate oxidation products such as Aldehydes and organic acids that are worse odor offenders.

Masking consists of adding more pleasant odorants to overcome the concentration of existing bad odors. It also can mean adding an anasthetic substances to depress the senses of smell. In this manner, the bad odor is less objectionable. Masking can also be done by blending several odors to diminish the intensity of the original one. Generally, masking involves the blending of two or more odors so that the total odor is increased but is more acceptable.

Counteraction is a method which consists of introducing two antagonistic odors so that when sniffed together, both odors can be diminished or even totally eliminated. Benzene, Toluene, Zylene, and Durene fall into this catagory. In counteraction, the total odor is decreased in intensity, where in masking it is increased in intensity. The disadvantage of both of these methods is that they are highly specialized fields, especially counteraction, and are not easily controlled.

Air borne can be destroyed by a great number of gas, gas-solid or gas-liquid chemical reactions. Two types of chemical groups exist, namely those that are specified reagents for specific contaminants, such as ammonia and acedic acid, and those with broad spectrum reagents for a broad range of contaminants, such as ozone and chlorine. In the use of such chemical reagents, great care must be taken since these reagents may be toxic, corrosive, irritating or odorous, or can produce end products with such properties.

Removal of odoriferous substances may also be achieved by adsorption, wherein adhesion of molecules of gasses takes place to the surface of solid bodies. Absorption depends on surface area and can become uneconomical when large quantities of air are to be treated. The same observation applies to chemabsorption. When a sorbate enters into chemical reaction with a sorbent, the bond is very strong and difficult and sometimes impossible to reverse. When two or more sorbates enter into chemical reaction by virtue of their proximity and condensed conditions in the sorbent state, this type of chemabsorption is also called "surface catalysis". The initial capital investment as well as maintainence costs in the use of these two methods is high.

Based on the above review of the existing methods of air purification, it becomes readily clear that no one method can do a complete job of eliminating odors from the air in an economical fashion.

Ozone, which is one of the most powerful oxidizing agents readily available to man, has a life span, although unstable, to make it live long enough to become objectionable to suburban communities. Yet, ozone is still the cheapest and one of the most effective oxidizers available.

Activated carbon is a well known adsorbant and can eliminate odors but works poorly on low concentrations. Another disadvantage of activated carbon is that used alone it cannot remove all odors from the air. The principle of the gas mask has been employed in many instances to eliminate odors and noxious vapors from living and working spaces. Such use have gained momentum in recent years with the introduction of air conditioning. The traditional method of removing odors and correcting a stale and vitiated atmosphere in living quarters is by ventilation with fresh air from outside. As suggested above, the admission of large quantities of outside air, however, can increase the cost of air conditioning to a prohibitive level.

In many situations, therefore, it has become a more general practice to recirculate much of the air and maintain the purity and freshness by passing the air continuously through a bed of granular activated carbon. As suggested above, however, this approach is not suitable, from a practical and economical point of view, where very intense or low concentrations of odoriferous substances are to be removed from air.

The present invention is for a method and apparatus for treating contaminated air efficiently and economically with an effectiveness not achievable with any of the above enumerated methods of purification. Both the initial capital expense, as well as the operation of the device of the present invention is substantially less than that of comparable devices known in the art. A further advantage of the present invention is that the treated air is substantially free of the odoriferous substances as well as free from any additional odors or chemicals which are generated during the treatment process.

SUMMARY OF THE INVENTION

It is an object of the present invention to provide a method of treating air containing odoriferous substances which does not have the above described disadvantages associated with comparable prior art methods.

It is another object of the present invention to provide a method of the type under discussion which is simple and economical to use.

It is still another object of the present invention to provide a method of treating air which requires a small initial capital expense.

It is yet another object of the present invention to provide a method of the type suggested in the other objects which utilizes ozone to oxidize odoriferous substances in air at one treatment zone, and converting the remaining ozone in the mixture to stable oxygen molecules at a second treatment zone by passage of the mixture through a bed of activated carbon.

It is a further object of the present invention to provide a method as described in the last object which further maintains the air to be treated in a constant flow through a tortuous path to assure contact between the ozone and the air to be treated for a predetermined period of time to assure oxidation of a substantial portion of the odoriferous substances prior to passage of the resulting mixture through the bed of activated carbon.

It is still a further object of the present invention to provide an apparatus which can carry out the method suggested in the above objects.

To achieve the above objects, as well as others which will become apparent hereafter, a method of treating air containing odoriferous substances in accordance with the present invention comprises the steps of introducing ozone into contaminated air at a first treatment zone and exposing the contaminated air to the ozone for a predetermined period of time. In this manner, the ozone is manintained in contact with the odoriferous substances for a sufficient time to oxidize a substantial portion of the latter. The ozone remaining in the mixture not utilized in the oxidation process is converted into stable oxygen molecules at a second treatment zone. In this manner, the air is substantially free of odoriferous substances as well as ozone upon removal from said second treatment zone.

Advantageously, the air is moved through an elongate, tortuous path forming the first treatment zone to provide said predetermined period of contact between the air and the ozone. Also, the ozone is introduced at the entry point of the air into said first treatment zone to maximize the period of contact between the odoriferous substances and the ozone.

In the presently preferred method, the air and the ozone are diffused upon entry into said first treatment zone and the mixture is further diffused when the same are transferred from said first to said second treatment zones.

The converting step in accordance with the presently preferred embodiment comprises the step of introducing a catalyst in the second treatment zone which accelerates the deterioration of ozone to stable oxygen molecules. The catalyst may be in the form of a bed of activated carbon. The activated carbon acts as the catalyst and additionally removes odoriferous substances from the air.

The apparatus of the present invention is in the form of an ozone contact chamber into which air and the odoriferous substances are admitted. Proximate to the entry points of the air and odoriferous substances, there is injected ozone by means of a generator which may be regulated to control the amount of ozone injected. The ozone and air are first diffused prior to entry into a tortuous elongate path in which the ozone oxidizes the odoriferous substances while the same are in contact for a predetermined period of time. The resulting mixture is then transferred into a second treatment zone through an air diffusing screen. The second treatment zone includes an activated carbon bed through which the mixture of odoriferous substances remaining in the air as well as the ozone which is still in its active form pass. The activated carbon bed serves to remove some odoriferous substances not oxidized in the ozone contact chamber. The activated carbon bed has the further advantageous function of serving as a catalyst which accelerates the deterioration of the ozone to stable oxygen molecules.

Accordingly, the present invention results in a double step treatment which is simple and economical. The least expensive oxidizing agent, ozone, is utilized to effectively treat organic compounds due to the strong oxidation properties thereof. However, to prevent the escape of remaining ozone, the second treatment step includes a conversion step wherein the remaining ozone is converted from its active state back to stable oxygen molecules.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is an idealized blocked diagram of the present invention, illustrating the admission of the air to be treated and ozone into a contact zone, followed by an ozone conversion zone where the ozone which has not been utilized to oxidize the odoriferous substances in the air is converted from the active state to stable oxygen molecules; and FIG. 2 is a schematic representation of a presently preferred practical embodiment of the present invention as depicted in FIG. 1.

DESCRIPTION OF THE PREFERRED EMBODIMENTS

Referring to FIG. 1, the present invention is illustrated in an idealized block diagram form. The present invention utilizes the desirable characteristics of ozone to oxidize odoriferous substances in air. As mentioned in the Background of the Invention, ozone is the most powerful oxidizing agent readily available to man. Ozone can do at low temperatures what air can do at very high temperatures. Only fluorine, fluorine oxides, and certain short-lived radicals and atoms exhibit greater oxidizing power.

In FIG. 1, a contact zone A is shown into which is admitted air with odoriferous substances producing the undesirable odors, as well as ozone. The manner in which the ozone is generated or obtained is not critical for the purposes of the present invention. However, the quantities of ozone injected into the contact zone must be regulated to provide effective and efficient operation. Typically, ozone is made during increased voltage intensity resulting in electrical charge and spark discharges in, preferably, dry air. As well known, three volumes of oxygen gives two volumes of ozone. Ozone, which consists of three oxygen molecules exhibits a ferocious urgency to divest itself on one of its oxygen atoms. It is for this reason that this gas exhibits such a strong oxidizing property.

The very high tendency of ozone to divest itself of its extra oxygen atom, also results in ozone having a relatively short life span, which is, however, a function of the ambient temperature. The life span of ozone can be from several minutes above 100°C to more than hours at low temperatures. It is because the life span of ozone can, under certain conditions, extend for hours, this powerful oxidizing agent has had limited use in air treatment plants. Clearly, the state of ozone remaining in the treated air mixture causes an obnoxious odor that is objectionable as well as toxic. Additionally, the use of ozone in a conventional manner to oxidize pollutants results in quantities of ozone escaping into the atmosphere which is both dangerous to the inhabitants in the area. Large quantities of ozone are also very corrosive and damaging to machinery and other equipment. For the above-mentioned, reasons, it is important that where ozone is utilized as an oxidant, that ozone remaining in the mixture be removed or converted back to its oxygen stable state prior to being released into the atmosphere.

In FIG. 1, ozone and air, including the odoriferous substances, are received within a contact zone A wherein the ozone and air are maintained in contact for a predetermined period of time. This determined period of time must be sufficient to permit oxidation of a substantial portion of the odoriferous substances within the contact zone A.

The reference letter B designates the flow or transfer of the treated mixture within the contact zone A into a further treatment zone C. Under ideal conditions, all the ozone introduced into the contact zone A is utilized to oxidize the odoriferous substances within the contact zone A so that the product at B is pure air, as modified by oxidation by-products, including oxygen, water and carbon dioxide. As a practical manner, it is almost impossible to oxidize all the odoriferous substances with a precisely measured amount of ozone. Accordingly, there will exit from the contact zone A ozone which has not been utilized in the oxidation process, as well as odoriferous substances which have not been oxidized by the ozone. Since a large proportion of the odoriferous substances have been oxidized within the contact zone A, the mixture of treated air leaving the contact zone A is relatively free of the odoriferous substances.

For example, in sewage treatment plants and most waste treatments facilities, odors consist of organic compounds, the general classification of which includes hydrocarbons, mercaptans, carbohydrates, amines and amides, etc. While the low concentrations of remaining odoriferous substances may be tolerable, the unused active ozone molecules remaining within the mixture may not be. This is particularly true where the odoriferous substances are at high concentrations or intense, this requiring relatively large quantities of ozone to be injected into the contact zone A. Ozone consumption is generally directly proportional to the oxidizable contaminants present in the air.

Still referring to FIG. 1, the ozone, air and small concentration of odoriferous substances at B are received within an ozone conversion zone C wherein treatment is primarily directed at conversion of ozone from the active state to the less active stable oxygen molecule form. In the ideal condition shown in FIG. 1, an excess amount of ozone is injected into the contact zone A to assure full oxidation of the odoriferous substances in the air to be treated. With all the odoriferous substances oxidized in the contact zone A, the remaining ozone not utilized in the oxidation process is transferred at B from the contact zone A to the ozone conversion zone C. In such circumstances, the ozone conversion zone C has only one function, namely the conversion of ozone to stable oxygen. The output of the conversion zone C is pure air. As will be described in connection with FIG. 2, however, the conversion zone C advantageously also has the further function of reducing the level of odoriferous substances which are transferred between the two zones.

An apparatus 10 is shown in FIG. 2, which represents a practical embodiment of the idealized system shown in FIG. 1. The apparatus 10 is utilized for treating air 12 which includes odoriferous substances of the type generally enumerated above.

The apparatus 10 includes a chamber 14, which represents an ozone contact zone, having air inlets 16, followed by an ozone conversion chamber 30 which includes an exit port where the treated air 12b is released.

An ozone generator 18, of any conventional type, is connected to an ozone distribution conduit 18a which extends into the chamber 14 and is connected to a series of ozone nozzles 18b which are distributed in an array relative to the openings 16 through which the air 12 flows. Advantageously, the ozone generator 18 is provided with means for regulating the amount of ozone which is transmitted to the ozone nozzles 18b. Once ejected from the nozzles 18b, the ozone 20 is carried by the stream of incoming air 12, as suggested by the directions of the arrows. As depicted, the ozone is introduced at the entry point of the air into the first treatment zone to maximize the period of contract between the odoriferous substances and the ozone.

An important feature of the present invention is to maintain contact between the ozone and the odoriferous substances for a predetermined period of time to thereby result in a substantial portion of the odoriferous substances being oxidized. In accordance with one presently preferred embodiment, the extended period of contact is achieved by moving the air through an elongate, tortuous or undulating path after the air and ozone have been diffused by a diffusing screen 22. The diffusing screen agitates the sometimes smooth streams of flowing air and ozone, the latter type of streams limiting the amount of contact between the ozone and odoriferous substances. The provision of the fusing screen assures at least a minimal amount of turbulence in the contact zone to thereby result in an optimum amount of contact and oxidation of the odoriferous substances.

The tortuous or undulating path may, for example, be formed by a series of plates or baffles 26 which are spaced from each other in the direction of air flow with successive baffles being closed at their ends to thereby result in a continuous undulating channel 26 through which the air-ozone mixture may pass, now in a state of turbulence, through a path suggested by the arrows 24a.

Advantageously, the ozone generator 18 includes means for regulating the amount of ozone which is injected through the nozzles 18b. As suggested above, the ratio of air to be treated to ozone must vary with the intensity of the odors to be treated. The ozone generator shall be capable of providing from five to forty parts per million by volume of air to be treated.

A further air diffuser screen 28 is provided between the ozone contact chamber 14 and the ozone conversion chamber or zone 30. The ozone remaining in the mixture leaving the ozone contact chamber as well as the air within the latter chamber, may assume stream flow by the time that the mixture leaves the tortuous path 26. The function of the air diffuser screen 28 is to again generate turbulence and break up the stream flow. It has been determined that the provision of an air diffuser screen 28 results in improved performance of the odor control apparatus 10.

The conversion chamber 30 includes an activated carbon bed 32 which extends substantially coextensively with the air diffuser screen 28 in a manner which requires that all the air which leaves the ozone contact chamber 14 passes through the activated carbon bed 32. It has been found that when the ozone generator 18 is adjusted to regulate the quantity of injected ozone to suit the nature and intensity of the odors, the residual ozone emanating or leaving the ozone contact chamber 14 is less than one part per million per volume. Such a mixture passes through activated carbon assures breakdown of the ozone to stable oxygen molecules and eliminates its spread in a residential neighborhood. While any other simple ozone conversion technique may be utilized following the ozone contact chamber 14, it has been found that the catalytic properties of activated carbon makes this material particularly suitable for the above described purposes.

For the arrangement shown in FIG. 2, the activated carbon bed 32 acts as a catalyst in converting the ozone from its active state to stable oxygen molecules. A further advantageous feature of using an activated carbon bed in the ozone conversion chamber or zone 30 is that the activated carbon bed also removes remaining odors by the phenomenon by adsorption. The sequence of double treatments in this manner results in an effective apparatus which can efficiently oxidize organic compunds in an ecomonical and efficientt manner. This is due to the very effective and economical cost of ozone. The excessive ozone injected into the system is rendered substantially less active by the conversion step wherein the ozone is converted from its active state back to oxygen.

The air which has passed through the activated carbon bed 32, designated by the arrows 12a, is substantially free of ozone as well as free from the odoriferous substances. While the odor control apparatus 10 illustrates an air blower 34 which establishes the flow of the stream of air through the apparatus 10, the air blower 34 may form part of an air conditioning unit or the like to which the two treatment chambers 14 and 30 are connected.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A method of treating air containing odoriferous substances, comprising the steps of
   introducing ozone into contaminated air at a first treatment zone,
   diffusing said air and ozone within said first treatment zone to increase contact between said ozone and odoriferous substances and to increase oxidation of said odoriferous substances,
   passing the diffused air and ozone through an elongate, undulating path within said first treatment zone to provide a predetermined period of contact between said air and said ozone for allowing sufficient time to oxidize a substantial portion of said odoriferous substances,
   diffusing said air and ozone exiting from said first treatment zone after leaving said undulating path to generate turbulence for increasing oxidation of any remaining odoriferious substances,
   passing the exiting diffused air and any remaining odoriferous substances and ozone into a second treatment zone,
   converting the remaining ozone into oxygen molecules and removing the remaining odoriferous substances from the air by passing the air containing the remaining ozone and odoriferous substances through a bed of activated carbon within said second treatment zone, so that the activated carbon removes the remaining odoriferous substances from the air and acts as a catalyst to accelerate the deterioration of the remaining ozone to stable oxygen molecules, and
   removing the air, which is substantially free of the odoriferous substances as well as the ozone, from said second treatment zone.

2. A method as defined in claim 1, wherein the ozone is introduced at the entry point of the air into said first treatment zone to maximize the period of contact between the odoriferous substances and the ozone.

3. A method as defined in claim 1, further comprising the step of adjusting the ratio of ozone to air to be treated as a function of the nature and intensity of the odoriferous materials.

* * * * *